(12) United States Patent
Koyabe et al.

(10) Patent No.: US 9,804,910 B2
(45) Date of Patent: Oct. 31, 2017

(54) DETECTION OF DATA CONNECTION LOSS

(71) Applicant: BRITISH TELECOMMUNICATIONS PUBLIC LIMITED COMPANY, London (GB)

(72) Inventors: Martin Wanyonyi Koyabe, London (GB); Zhan Cui, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 12 days.

(21) Appl. No.: 14/653,596

(22) PCT Filed: Dec. 6, 2013

(86) PCT No.: PCT/GB2013/000533
§ 371 (c)(1),
(2) Date: Jun. 18, 2015

(87) PCT Pub. No.: WO2014/096753
PCT Pub. Date: Jun. 26, 2014

(65) Prior Publication Data
US 2015/0347215 A1    Dec. 3, 2015

(30) Foreign Application Priority Data

Dec. 20, 2012 (EP) .................................... 12250183

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0769* (2013.01);
(Continued)

(58) Field of Classification Search
CPC .............................. G06F 11/079; H04L 41/064
(Continued)

(56) References Cited

U.S. PATENT DOCUMENTS 7,289,449 B1 * 10/2007 Rubinstein .......... H04L 12/6418
370/216
7,318,094 B1 * 1/2008 Kirti ..................... H04L 41/142
370/245

(Continued)

OTHER PUBLICATIONS

International Search Report for PCT/GB2013/000533 mailed Feb. 11, 2014, four pages.

*Primary Examiner* — Dieu-Minh Le
(74) *Attorney, Agent, or Firm* — Nixon & Vanderhye P.C.

(57) ABSTRACT

A method of detecting loss of data connection in a plurality of links between an exchange and one or more of a plurality of network terminals arising during presence of a user at an intervention point node on the links between the exchange and the network terminals, comprising: receiving connection information about a loss of data connection on any one of the links; receiving duration information about a duration of the user presence at the intervention point node; determining if the loss of data connection occurred within the user presence duration; causing line tests to be conducted on each of the links for which loss of data connection is determined to have occurred within the user presence duration; receiving results of the line tests including a number of links being determined, by the line test, to exhibit a fault; and determining if the number of links determined to exhibit a fault exceeds a predetermined threshold number.

24 Claims, 3 Drawing Sheets

(51) Int. Cl.
*H04L 12/26* (2006.01)
*H04L 12/24* (2006.01)
(52) U.S. Cl.
CPC ........ *H04L 41/064* (2013.01); *H04L 41/0645* (2013.01); *H04L 43/50* (2013.01)
(58) Field of Classification Search
USPC .............................. 714/43, 44, 45, 46, 4.1
See application file for complete search history.

(56) References Cited

U.S. PATENT DOCUMENTS

| | | | |
|---|---|---|---|
| 7,542,428 B1* | 6/2009 | Johnson | H04L 41/064 370/241 |
| 7,804,767 B1* | 9/2010 | Owens | H04L 45/00 370/217 |
| 7,940,685 B1* | 5/2011 | Breslau | H04L 43/0835 370/251 |
| 2006/0098725 A1 | 5/2006 | Rhee et al. | |
| 2006/0233311 A1* | 10/2006 | Adams | H04L 12/2697 379/21 |
| 2007/0100978 A1* | 5/2007 | Levi | H04L 12/5855 709/223 |
| 2009/0013210 A1* | 1/2009 | McIntosh | H04L 12/2697 714/4.1 |

* cited by examiner

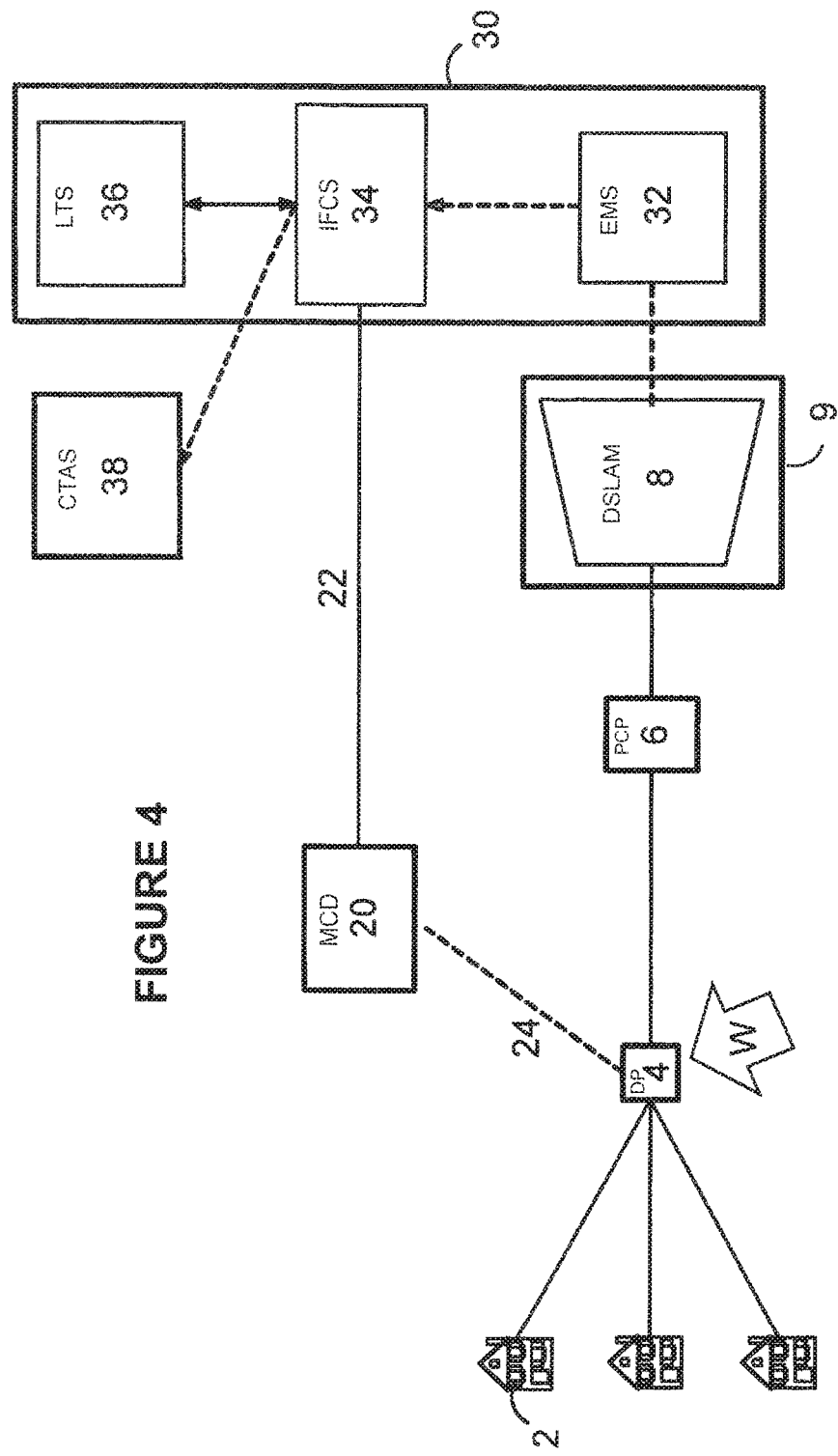

DETECTION OF DATA CONNECTION LOSS

This application is the U.S. national phase of International Application No. PCT/GB2013/000533 filed 6 Dec. 2013 which designated the U.S. and claims priority to EP 12250183.6 filed 20 Dec. 2012, the entire contents of each of which are hereby incorporated by reference.

BACKGROUND AND SUMMARY

This invention relates to apparatus, systems and methods for the real time or near real time detection of data connection losses, particularly those experienced in the access network of a telecommunications network. Such detection allows for remedial action to be taken swiftly. This is especially so if the fault causing the connection loss can be identified to be of a type allowing for personnel already at suitable locations in the network to work on the faults before they leave the locations. In a specific exemplary implementation, such identifiable faults include those caused by an "intervening act" in the access network.

The terms "intervening act" or "interventions" herein refer to activities by parties such as telecommunications engineer or similar personnel despatched by a telecommunications company to work on intervention point plant and nodes located in the access network such as distribution points (DPs) or cross-connection points such as primary cross-connection points (CCPs/PCPs). In the conduct of such work (e.g. to install a new service, or to carry out repairs), the engineer's activities may inadvertently cause a fault to another line(s) at the worksite, such as the DP or PCP in question or in any case, in the same part of the network as the line that is being worked upon. In the experience of the applicant, a perhaps-surprisingly high number of such "intervention faults" are generated on a regular basis. Some of these faults may cause the gradual degradation of the affected customer's connection, while many others are "instant breaks" caused by e.g. dislodgment of the affected link from a terminal block in a DP cabinet. Instant breaks result in the immediate loss of data connection to the customer concerned, i.e. even while the engineer or operative is still at the worksite. The scale of intervention faults generated can be considerable, especially where there is much activity in the access network e.g. when and where a fibre to the cabinet (FTTC) service is being provisioned.

Ideally, the engineer would know immediately when he causes an intervention fault. The reality however, is that this is often difficult or even impossible in view of the enormous number of cables crowded into a tightly-packed cabinets and other plant located in the open environment in variable weather conditions. Telecommunications companies typically do not detect and repair intervention faults in real time before the engineer leaves the site: conventionally, they first learn of the problem when a customer makes a complaint, which even in the case of instant breaks, are usually made after the engineer has left the site. At that stage, a second engineer call-out has to be made to the site to repair the intervention fault caused during the first engineer visit. As might be expected, each engineer visit has a cost associated with it, and this repetition of visits is wasteful of time and other resources. Perhaps more importantly, there is a negative impact on customer relations as the required repairs are seldom immediately carried out, but instead scheduled in the usual way in a queue so that the affected link may be down for hours if not days or more. In this way, a potentially simple repair which the engineer might have been able to attend to during the first attendance might spiral into a significant period of service outage, customer dissatisfaction and unnecessary cost for the service provider.

It would be desirable for intervention faults to be repaired without being customer complaint-driven, in a way which minimises service disruption and doing away with the need for a subsequent engineer visit.

The present invention accordingly provides, in a first aspect, a method of detecting loss of data connection in a plurality of links between an exchange and one or more of a plurality of network terminals arising during presence of a user at an intervention point node on the links between the exchange and the network terminals, comprising: receiving connection information about a loss of data connection on any one of the links; receiving duration information about a duration of the user presence at the intervention point node; determining if the loss of data connection occurred within the user presence duration; causing line tests to be conducted on each of the links for which loss of data connection is determined to have occurred within the user presence duration; receiving results of the line tests including a number of links being determined, by the line test, to exhibit a fault; and determining if the number of links determined to exhibit a fault exceeds a predetermined threshold number.

Preferably the connection information comprises an instantaneous or near instantaneous report about loss of data connection on any one of the links.

Preferably the connection information comprises a loss of synchronisation alarm received from a multiplexer or access node in the exchange via an element management system.

Preferably, receiving connection information comprises failure to receive a signal indicative of a restoration of the connection.

Preferably the duration information takes the form of user presence start and stop times received from the user while at the intervention node point.

Preferably the method further comprises sending, to the user, information about the affected links, wherein the information includes the identity of the affected links if the number of affected links falls below the predetermined threshold number.

Preferably the method further comprises sending information to a cable theft alert system if the number of affected links exceeds the predetermined threshold number.

Preferably the loss of data connection in links between an exchange and one or more of a plurality of network terminals arises as a result of user activity at the intervention point node.

The present invention accordingly provides, in a second aspect, an apparatus for detecting loss of data connection in links between an exchange and one or more of a plurality of network terminals arising during presence of a user at an intervention point node on the links between the exchange and the network terminals, comprising a processor arranged to: receive connection information about a loss of data connection on any one of the links; receive duration information about a duration of the user presence at the intervention point node; determine if the loss of data connection occurred within the user presence duration; cause line tests to be conducted on each of the links for which loss of data connection is determined to have occurred within the user presence duration; receive results of the line tests including a number of links being determined, by the line test, to exhibit a fault; and determine if the number of links determined to exhibit a fault exceeds a predetermined threshold number.

Preferably the intervention point node comprises a distribution point or a cross-connection point in a telecommunications network.

Preferably the processor is arranged to receive connection information in the form of a loss of synchronisation alarm from a multiplexer or an access node located in the exchange.

The present invention accordingly provides, in a third aspect, a system for identifying loss of data connection in links between an exchange and one or more of a plurality of network terminals arising during presence of a user at an intervention point node on the links between the exchange and the one or more network terminals, comprising: an apparatus for detecting loss of data connection as described above; an element management system by which the apparatus receives connection information; a communications device by which the apparatus receives duration information; and a line test system.

Preferably the system further includes a cable theft alert system.

The present invention accordingly provides, in a fourth aspect, an access network comprising a system as described above and further comprising: an exchange; a multiplexer or an access node located at the exchange; a plurality of network terminals; and an intervention point node located on the links between each of the plurality of network terminals and the exchange.

The present invention seeks to identify in real- or near real-time, those connection losses in a network which are capable of repair at the work location where a user or engineer is already present. As there are many different causes of faulty data links however, not all faults on the line passing through the intervention point node (e.g. a DP or a CCP/PCP) where the engineer is present at a given time, are necessarily capable of being remedied. For example, the fault on the line could lie upstream or downstream of the engineer's location within the network. To remove or reduce the chances of wrongly identifying a fault as one which can be worked on by the present engineer, implementations of the method involve an analysis of time and place data to generate an "engineer-centric" view of the status of the links in question, which includes a test which helps generate a profile of the possible cause of the faulty line(s).

Connection information that at least one of the lines running through the DP or PCP is suffering from connection loss (which may include quality degradation) is initially obtained. In preferred implementations, this connection information provides an almost instantaneous snapshot of the status of the links, preferably in the form of loss of sync alarms. The system checks if this connection loss occurred during the time when the engineer was present at the DP, PCP or such other intervention point. If it was, that line determined to be faulty is line-tested. The number of such faulty lines passing through the intervention point node is collated, and compared against a pre-determined threshold number. Where the number of lost connections exceeds the threshold number, it may be deemed that the problem is something which the engineer cannot address e.g. an instance of cable theft (in which typically a large number of cables are simultaneously cut). A more likely profile of fault(s) of the kind which can be repaired at the DP or PCP is one in which the actual number of faulty links lies below the threshold number, indicating e.g. intervention faults caused by earlier provisioning or repair activity. The threshold number is selected according to the telecommunications company's own policies, historical data or like, as being indicative of what is thought to be indicative of a larger problem like an event of cable theft.

Preferably, connection information about faulty lines takes the form of loss of synchronisation alarms received from a DSLAM or MSAN located in the exchange via an element management system. As will be explained further below, the two relevant types of loss of synchronisation messages respectively indicate that connection has been lost, and that the connection has been regained or restored. In a preferred implementation, information about the loss of connection comprises failure to receive a signal indicating that connection has been restored after the link is known to have gone down.

In a preferred application, the user or engineer signals his presence at the intervention point by stating "start" and "stop" times which may include the times he started and stopped activity at the node. In response, the system will eventually respond to the engineer at the worksite with a message which includes information about those links identified to have a fault of a nature capable of being repaired. If there are no faulty lines, a null list of directory numbers is sent. This may also the case if the number of faulty links exceeds the pre-determined threshold (as the engineer is unable to repair such faults), although some other indication may be sent. In both cases, the engineer will typically close the job and leave the site. It is only if the faulty lines are identified to be of a nature capable of repair, that the response message to the engineer will include a list of those links needing repair, allowing for work to commence on those identified line.

BRIEF DESCRIPTION OF THE DRAWINGS

Systems, methods and apparatus embodying the present invention will now be described by way of example only, with reference to the following drawings, in which:

FIG. 4 depicts the a system for detection of an intervention fault.

DETAILED DESCRIPTION

Figure 1:
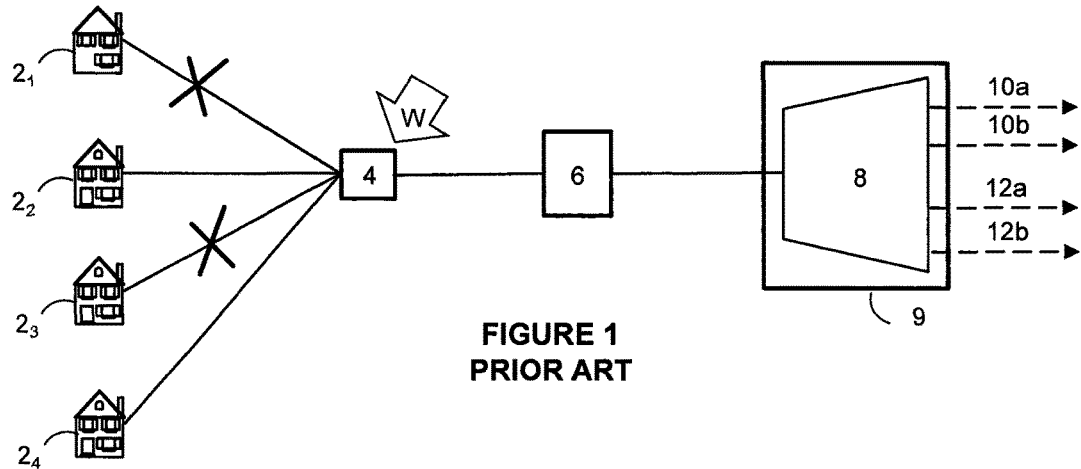
FIG. 1 depicts an intervention fault in an access network of the prior art.

FIG. 1 depicts the relevant components of a conventional telecommunications access network. Customer premises ($2_1$, $2_2$, $2_3$, $2_4$; 2 generally) at one end are connected via an network terminal (NT) to an access node at the other end in the form of a digital subscriber line access multiplexer (DSLAM) or a multi-service access node (MSAN) (8) located within the local exchange (9). (For ease of description, references to the DSLAM herein includes MSANs where the context permits.) The access network architecture typically consists of a branching topology in which the NTs are linked to the local exchange via distribution points (DP) (4) and primary cross-connection connect point (PCPs) (6). DPs and PCPs are points of entry for engineers to terminate or test the network, i.e. to make an intervening act. In an all-copper access network, the links comprise copper pairs. As noted above, the DSLAM (8) module can be placed at points between the customer and the local exchange in various FTTx network architectures, in which case copper cable is replaced by an optical link at the relevant point back to the local exchange.

One of the functions of a DLSAM is to monitor its link to each of the NTs at the other end of the data connection. Any loss of signal or synchronisation (LoS) with a particular NT would typically cause the DSLAM at the exchange end to raise an LoS alarm identifying the affected link with the NT. In this way, LoS alarms generated by a DSLAM located in the local exchange (or the DP street cabinet in a Fibre to the cabinet (FTTC) scenario), can detect events occurring along the cable between the customer's premises and the local exchange, ranging from the customer turning off home hub or temporary work, to inadvertent disconnection or malicious physical damage e.g. cable theft. LoS alarms are raised almost-instantaneously upon occurrence of service interruption, and so can serve as a real time flag for faults. LoS alarms generated by the DLSAMs are forwarded to an Element Management System (EMS) (32, FIG. 4), which function will be discussed further below in connection with FIG. 4.

Information about the identity of the link included in LoS alarms is derived from the unique telephone number or Directory Number (DN) assigned by the telecommunications company or service provider to each customer premises (2). In the arrangement shown FIG. 1 therefore, each customer premises ($2_1$, $2_2$, $2_3$, $2_4$, ... $2_n$) is respectively logically represented by a DN ($DN_1$, $DN_2$, $DN_3$, $DN_4$, ... $DN_n$).

In the exemplary network shown in FIG. 1, an intervention fault arises through an intervention in the access network from work on the DP (4) as indicated by the arrow (W). Typically, the intervention fault will result in the loss of connection between the NT at the customer end (2) and the DSLAM at the local exchange (9), as represented here by the crosses on the links between the DP and affected customer premises ($2_1$ and $2_3$). "Sync lost" LoS alarms (10a, 10b; 10 generally) (denoted by $Alarm_0$) are generated by the DSLAM (8) in the event that connection is lost with an NT (i.e. those in customer premises ($2_1$ and $2_3$) in the example discussed here). If the lost data connection is subsequently regained, e.g. in the case of temporary work on the line or where the connection is repaired, the DSLAM generates "sync restored" signals or alarms (12a, 12b; 12 generally) (denoted by $Alarm_1$). In the present example therefore, when customer premises ($2_1$ and $2_3$) associated respectively with DNs ($DN_1$ and $DN_3$) lose connection to the DSLAM, it generates LoS alarms $Alarm_0DN_1$ (10a) and $Alarm_0DN_3$ (10b). If and when connection is restored to the affected ONTs, the DLSAM generates "sync restored" LoS alarms $Alarm_1DN_1$ (12a) and/or $Alarm_1DN_3$ (12b) as applicable. As previously noted, these "sync lost" and "sync restored" LoS alarms are sent to the EMS.

Figure 2:
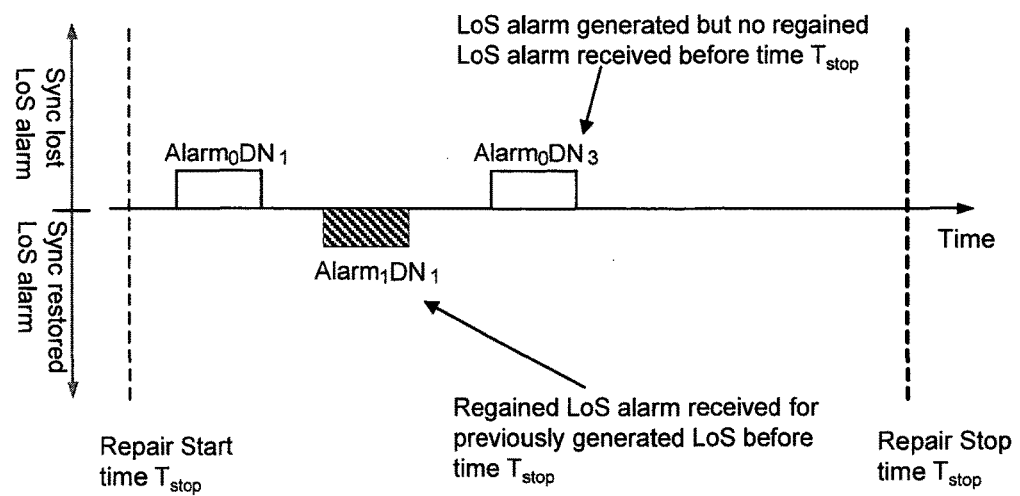
FIG. 2 is a time sequence diagram depicting the generation of loss of synchronisation alarms.

Referring now to the time sequence diagram in FIG. 2, this depicts the LoS alarms generated by a DLSAM during a field work or repair session at a particular worksite e.g. at a DP. The work session during which the engineer is present at the intervention point node, is defined by the repair session start time $T_{start}$ and the repair end time $T_{stop}$. In this example, the engineer was called out to repair a fault on the line denoted by $Alarm_0DN_1$. After the work session commences, the engineer successfully restores connection to customer premises ($2_1$), at which point the DSLAM outputs $Alarm_1DN_1$. During the session however, the engineer accidentally knocks loose the link to customer premises ($2_3$) at the DP cabinet. This loss of data connection is detected by the DLSAM at the far end, which raises LoS alarm $Alarm_0DN_3$. The engineer is however unaware of the intervention fault caused, and closes the job, ending the work session at time $T_{stop}$. The telecommunications service provider also does not know about the problem, unless and until customer ($2_3$) raises a complaint.

Figure 3:
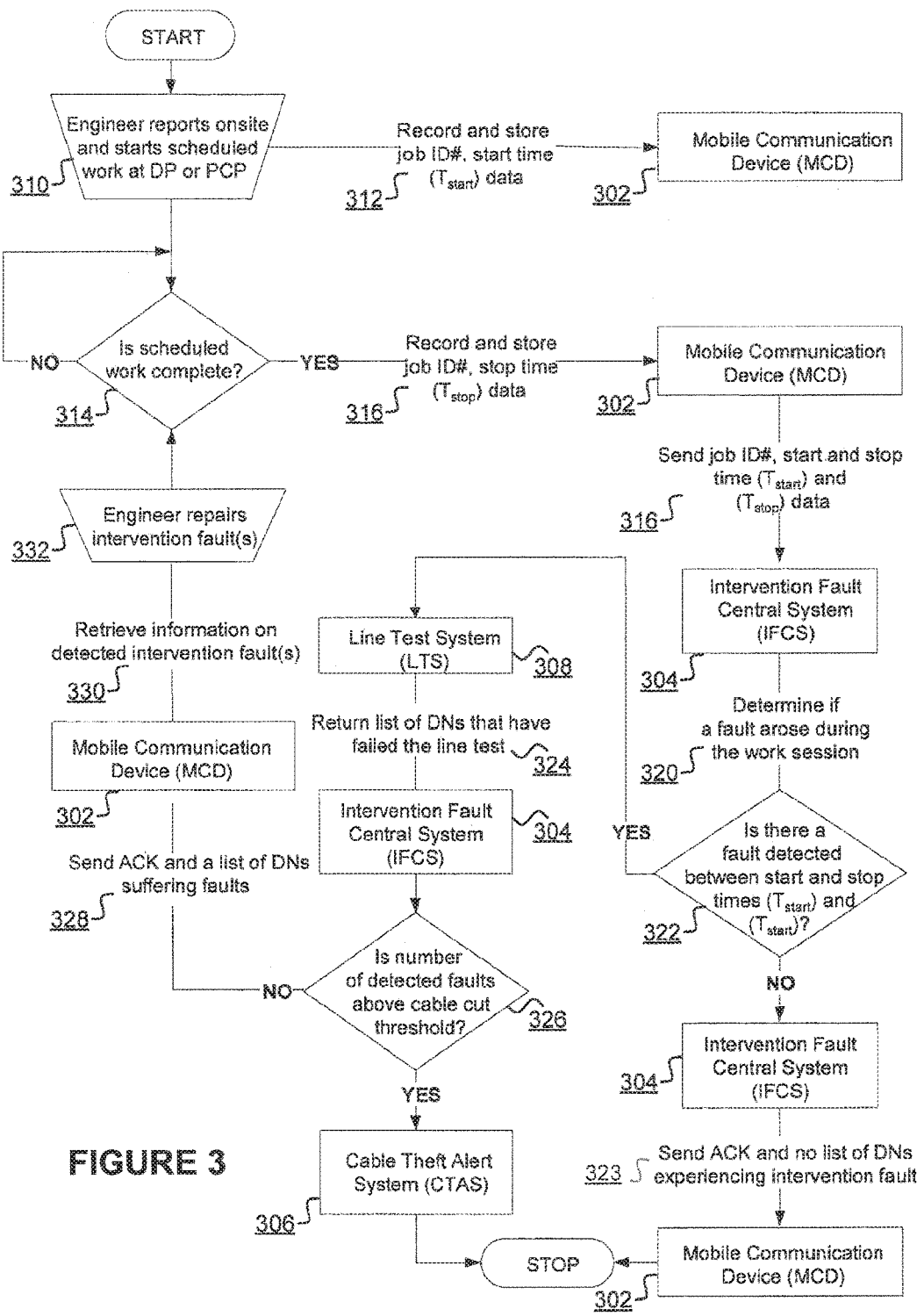
FIG. 3 is a flow chart showing detection of an intervention fault according to the invention.

The flow chart of FIG. 3 describes steps in an exemplary method according to the invention, which addresses the problem of detecting intervention faults in a way to allow for them to be repaired before the engineer leaves the site.

At the start of the process at step 312, the engineer reports at an intervention point node or site such as the DP or the PCP by recording and storing field work data such as the job ID number, and the actual start time ($T_{start}$) in a mobile communication device (MCD) 302 such as a laptop or a smart phone. Work starts 310 on the scheduled work for which the engineer was despatched to the site, such as the provision of a new service, or repair of an existing fault (such as the fault on the line of customer ($2_1$) in the example discussed in connection with FIG. 2). When this original scheduled work is complete 314, the engineer records and stores in the MCD the scheduled field work data and the actual end or stop date and time ($T_{stop}$) when the task is completed at step 316. At this point, the DSLAM will generate a $Alarm_1DN_1$ signal confirming the reinstatement of customer ($2_1$)'s broadband connection. The engineer then sends 316 a message via e.g. text or email from his MCD 302 to a central unit having care of intervention fault detection, which is here termed the Intervention Fault Central System (IFCS) 304. As will be discussed below in connection with FIG. 4, this service is provided by the telecommunications operator, although it would be appreciated that it can also be provided by other parties. The message from the work site sent at step 316 includes the duration of the work session as defined by the start and stop dates and times ($T_{start}$) and ($T_{stop}$), as well as the identity or location of the worksite (e.g. the identity or location of the DP or PCP in question) which allows identification of the particular DSLAM or exchange affected by the work.

As a next step, the IFCS 304 determines, at steps 320 and 322, whether any intervention faults were created during the work session i.e. between times ($T_{start}$) and ($T_{stop}$) on the lines connecting the NTs to the exchange via the DP or PCP identified in the engineer's message. This process uses any newly generated "sync lost" LoS alarms output by the DSLAM in respect of the NTs to which the DP or PCP at the worksite is normally or would be expected to be connected. Referring back to the example referred to in FIG. 2, signal $Alarm_0DN_3$ is newly-raised by the DSLAM. At the time when the engineer sends the message from the work site after completing the original job, there is no indication that the data connection has been regained. In contrast with the conventional approach however, the engineer does not close the job at the time $T_{stop}$. Instead, the engineer stays at the site and keeps the job open until he receives a response from the IFCS 304 to his message.

If the IFCS 304 determines that there are no LoS alarms from the DSLAM affected by the engineer's work at the point when the engineer sends his message, it can be concluded, at step 323, that no intervention faults have been created during the work session. At this point, the waiting engineer's MCD 302 receives a message from the IFCS 304 comprising an acknowledgement signal (ACK) and "no list of DNs". This is an "all clear" notice to the engineer who can then close the job at the worksite.

If on the other hand, a "sync lost" LoS alarm is detected, this is an indication of a fault on identified customer's broadband line. It may be that this is a known pre-existing fault (i.e. not newly-generated) in which case it may be ignored for present purposes, unless of course the fault can also be repaired by the engineer at the site. Alternatively, it may be a fault occurring on another section of the connection, or be of such a nature which cannot be repaired at the site, in which case it is also ignored for present purposes. An example of the kind of fault which cannot be addressed by the engineer at the site is that caused by a physical break in the link resulting from an accidental cable cut or theft by copper thieves. The exemplary system of the invention looks to more clearly identify the nature and location of the fault to ensure that the response message to the waiting engineer pertains to intervention faults which can be fixed at the site. This is achieved by the IFCS 304 using a procedure which commences with a line test 324 on the link identified in the "sync lost" LoS alarm, which can be carried out by a line test system (LTS) 308. There are various known methods of line-testing wires or metallic cables, such as using a test head in the exchange to measure line resistance or capacitance to estimate the length of the copper pair from the local exchange. A comparison of the result with what the length should be as recorded in e.g. an asset register or similar databases will give a good indication as to whether the cable if damaged. This technique also indicates the location of the fault in the network. There are alternatives to line tests of the above described type, such as loopback tests in which data sent into the cable and verifying if this is returned to source, time domain reflectometers which use echo ranging, and so on. References to "line tests" in the application shall be deemed to include all suitable methods for determining if a cable or link is physically damaged along its length rendering it incapable of onwardly transmitting signals.

Following the completion of the line test on the link between the exchange and the customer premises in which the affected NT is located, the LTS 308 returns 324 a list of DNs which have failed the test which is sent to the IFCS 304, which compares the number of failed lines or DNs with a pre-determined threshold number 326. The number threshold can be selected and set by the network operator based on e.g. past experience and historical data, and the threshold alarms number and time period are preferably resettable metrics.

If the number of "sync lost" LoS alarms from a cable serving a number of customer premises exceeds the threshold within a pre-specified duration, this is deemed to be indicative of a cable cut or the like, perhaps along the link between the DP and the PCP (as shown in FIG. 1), as being a better fit of the profile of near-simultaneous loss of all the lines of customers premises (e.g. (2₁, 2₂, 2₃, 2₄) of FIG. 1). In such an event, the matter can be passed to e.g. a cable theft alert system (CTAS) 306 which may be of the type described in the applicants co-pending application no. EP 12250081.2.

If on the other hand, the number of detected "sync lost" LoS alarms does not exceed the set threshold, the IFCS 304 deems that the detected faults were indeed intervention faults caused by the engineer's intervention at the worksite, i.e. a type of fault which can be repaired by the engineer at the site. At this stage, an ACK message with a list of the adversely affected DNs is sent 328 to the MCD 302 of the waiting engineer. Upon receipt, the engineer starts work to repair 332 the identified line(s) affected by intervention fault(s) which have detected in real time by the IFCS 304.

Yet another possibility is that a "sync lost" LoS alarm is generated on a relevant line as a matter of coincidence: where for example, a customer (e.g. at premises (2₂)) has chosen to switch off his broadband hub within the work session period defined by times ($T_{start}$) and ($T_{stop}$). In such an event, the system may identify this as an intervention fault. To counter this however, the IFCS configuration may optionally be refined to include further tests or qualifying criteria to remove such cases from the list of affected DNs sent to the waiting engineer.

Referring back to the flow chart of FIG. 3, it can be seen that work required on intervention faults are treated as original scheduled jobs. Because the repair work on the interventional fault(s) could generate further intervention faults, the steps relating to repair work are iterated until no intervention faults are detected by the IFCS 304. The process ends by sending the engineer an ACK message with "no list of DNs", at which point the process terminates and the engineer closes the job.

Turning now to FIG. 4, this is a schematic depiction of the components of an exemplary network configured for real time detection of intervention faults according to the invention. The access network comprising customer premises (2) are connected to the local exchange (9) via a DP (4) and a PCP (6) in the conventional way. In this example, an intervening act (arrow W) is being carried out by way of work on the DP (4). The engineer at the site carries an MCD (20) which as noted above, is any hand-held communication or computing device. Information (24) about his work on the DP (or the PCP if the engineer is working on the PCP) is sent using the MCD to the IFCS (34). Ideally, the MCD takes the form of a laptop or a smart phone although any suitably-configured dedicated or single-purpose device can be used to obtain a preferably-secure communications link (22) to the IFCS (34) which may be wired but is more typically a wireless connection.

The IFCS (34) is located at the network operator end (30), although it is possible to site this central function anywhere within the network and for it to be operated by any other party. For example, it may be located in the exchange (9) in respect of a particular subnet or local access network. The IFCS is essentially a processor configured to determine if any "sync lost" LoS alarms generated in respect of lines connecting NTs via the site of the intervention, are intervention faults created during the time of the intervening act i.e. between times ($T_{start}$) and ($T_{stop}$). As explained above, this is achieved by obtaining the results of a line test carried out by the LTS (36), and if the resulting number accords with certain pre-determined number range (e.g. below a pre-set threshold) or satisfies other pre-determined criteria which may be quantitative or qualitative, the IFCS can provide a determination of whether a particular LoS alarm is likely to be indicative of an intervention fault (which the waiting engineer can address) or some other fault (which the engineer will not be able to repair), such as cable theft which can be handled by a special-purpose CTAS (38), in which faults determined to be caused by cable cuts and theft can be addressed by e.g. alerting the authorities to enable a fast response at the site of the suspect activity.

The IFCS is also responsible for coordinating and managing multiple functional requests from a number of field engineers. For example, an engineer might request retransmission of particular data from IFCS related to a particular job, while other engineers might be waiting for IFCS to send a clear code if no intervention faults exist on their jobs. It will be appreciated that the IFCS can be further configured to coordinate and process information being exchanged between itself and the various engineers to build a more complex, comprehensive picture of the link status of a certain part(s) of the access network, which might prove useful in tracking down causes of faults in a wider context.

As noted above, the LoS alarms generated by the DSLAM (8) signalling dis- or re-connections on links with NTs are sent to the EMS (32). An EMS is a network management tool in respect of network elements (i.e. network devices such as DLSAMs, MSANs, line cards, and the like) within the access network, in which one EMS is used to manage a number of exchanges. For present purposes, the EMS enables the generation of "sync lost" and "sync restored" LoS alarms required in the exemplary implementation of the invention.

The near-instantaneous generation of LoS alarms advantageously allows for problem data connections to be very quickly identified in almost real-time, enabling a check to be conducted to ensure that all is as it should be at the intervention point node of the DP, PCP or the like, before the engineer closes the job and leaves. Ideally, this allows for repair works to be carried out so quickly on intervention faults that the customer may not even be aware that such a fault has occurred on their line.

The invention as described by reference to the exemplary embodiments and implementations herein enjoy the further advantage that no significant changes or additions need be made to the network, as it uses existing technology and requires minimal resources to integrate the described methods into the telecommunication service provider infrastructure.

As noted above, implementations and embodiments of the invention are suitable for detecting connection faults occurring at specific times and places within the telecommunications network where personnel such as an engineer are present. Although the description pertains in the main to the repair of intervention faults, the skilled person would appreciate the advantages of identifying a fault which can be fixed by the engineer before he leaves the intervention point node or site, however the fault is caused, e.g. where the fault arises at the DP or PCP by coincidence.

The apparatus, methods and configurations described above and in the drawings are for ease of description only and not meant to restrict the invention to any particular implementation or embodiment. It will be apparent to the skilled person that various sequences and permutations on the apparatus and methods described are possible within the scope of this invention as disclosed.

What is claimed is:

1. A method of detecting loss of data connection in a plurality of links between an exchange and one or more of a plurality of network terminals arising during presence of a user at an intervention point node on the links between the exchange and the network terminals, comprising:
   receiving connection information about a loss of data connection on any one of the links;
   receiving duration information about a duration of the user presence at the intervention point node;
   determining in real-time or near real-time, using a computer hardware processor, if the loss of data connection occurred within the user presence duration;
   causing line tests to be conducted on each of the links for which loss of data connection is determined to have occurred within the user presence duration;
   receiving results of the line tests including a number of links being determined, by the line test, to exhibit a fault; and
   determining if the number of links determined to exhibit a fault exceeds a predetermined threshold number.

2. A method according to claim 1 wherein the connection information comprises an instantaneous or near-instantaneous report about loss of data connection on any one of the links.

3. A method according to claim 1 wherein the connection information comprises a loss of synchronisation alarm received from a multiplexer or access node in the exchange via an element management system.

4. A method according to claim 1 wherein receiving connection information comprises failure to receive a signal indicative of a restoration of the connection.

5. A method according to claim 1 wherein the duration information takes the form of user presence start and stop times received from the user while at the intervention node point.

6. A method according to claim 1 further comprising sending, to the user, information about the affected links, wherein the information includes the identity of the affected links if the number of affected links falls below the predetermined threshold number.

7. A method according to claim 1 further comprising sending information to a cable theft alert system if the number of affected links exceeds the predetermined threshold number.

8. A method according to claim 1 wherein the loss of data connection in links between an exchange and one or more of a plurality of network terminals arises as a result of user activity at the intervention point node.

9. The method of claim 1, wherein the intervention point node comprises a distribution point in a telecommunications network, the distribution point being arranged between the network terminals and the exchange.

10. The method of claim 1, wherein the intervention point node comprises a cross-connection point in a telecommunications network, the cross-connection point being arranged between the network terminals and the exchange.

11. The method of claim 1, wherein the connection information comprises a real-time or near-real time identification about loss of data connection of one or more of the links.

12. The method of claim 1, further comprising, indicating an intervention fault when a determination is made that the number of links determined to exhibit a fault does not exceed the predetermined threshold number.

13. Apparatus for detecting loss of data connection in links between an exchange and one or more of a plurality of network terminals arising during presence of a user at an intervention point node on the links between the exchange and the network terminals, comprising a computer hardware processor arranged to:
   receive connection information about a loss of data connection on any one of the links;
   receive duration information about a duration of the user presence at the intervention point node;
   determine, in real time or near real-time, if the loss of data connection occurred within the user presence duration;
   cause line tests to be conducted on each of the links for which loss of data connection is determined to have occurred within the user presence duration;
   receive results of the line tests including a number of links being determined, by the line test, to exhibit a fault; and
   determine if the number of links determined to exhibit a fault exceeds a predetermined threshold number.

14. Apparatus according to claim 13 wherein the intervention point node comprises a distribution point or a cross-connection point in a telecommunications network.

15. Apparatus according to claim 13 wherein the processor is arranged to receive connection information in the form of a loss of synchronisation alarm from a multiplexer or an access node located in the exchange.

16. The apparatus of claim 13, wherein the connection information comprises a real-time or near-real time identification about loss of data connection of one or more of the links.

17. The apparatus of claim 13, wherein the duration information includes a user presence start time at the intervention point node and a user presence stop time at the intervention point node.

18. The apparatus of claim 13, wherein the processor is further arranged to send, to the network terminal, information about the affected links, wherein the information includes the identity of the affected links if the number of affected links falls below the predetermined threshold number.

19. The apparatus of claim 13, wherein the computer hardware processor is further arranged to indicate an intervention fault when a determination is made that the number of links determined to exhibit a fault does not exceed the predetermined threshold number.

20. The apparatus of claim 13, wherein the computer hardware processor is further configured to send information to a cable theft alert system if the number of affected links exceeds the predetermined threshold number.

21. A system comprising:
a plurality of network terminals;
an intervention point node;
an exchange;
links established between the exchange and the plurality of network terminals;
an apparatus for identifying loss of data connection in the links between the exchange and one or more of the plurality of network terminals arising during presence of a user at the intervention point node on the links between the exchange and the one or more network terminals, the apparatus comprising: an element management system by which the apparatus receives connection information, a communications device by which the the apparatus recives duration information; and a computer hardware processor at least arranged to:
receive connection information about a loss of data connection on any one of the links;
receive connection information about a duration of the user presence at the intervention point node;
determine, in real time or near real-time, if the loss of data connection occured within the user presence duration;
cause line tests to be conducted on each of the links for which loss of data connection is determined to have occured within the user presence duration;
receive results of the line tests including a number of links being determined, by the line test, to ezhibit a fault; and
determine if the number of links determined to exhibit a fault exceeds a predetermined threshold number.

22. A system according to claim 21 further comprising a cable theft alert system configured to receive a signal from the computer hardware processor if the number of affected links exceeds the predetermined threshold number.

23. An access network comprising a system of claim 21 further comprising:
a multiplexer or an access node located at the exchange.

24. The system of claim 21, wherein the computer hardware processor is further arranged to indicate an intervention fault when a determination is made that the number of links determined to exhibit a fault does not exceed the predetermined threshold number.

* * * * *